United States Patent
Lippert et al.

(10) Patent No.: US 10,801,588 B2
(45) Date of Patent: Oct. 13, 2020

(54) MULTI-SPEED TRANSMISSION

(71) Applicant: FORD GLOBAL TECHNOLOGIES, LLC, Dearborn, MI (US)

(72) Inventors: Robert Scott Lippert, Ann Arbor, MI (US); Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 684 days.

(21) Appl. No.: 13/788,535

(22) Filed: Mar. 7, 2013

(65) Prior Publication Data

US 2014/0256498 A1 Sep. 11, 2014

(51) Int. Cl.
*F16H 3/66* (2006.01)
*F16H 3/62* (2006.01)

(52) U.S. Cl.
CPC ............... *F16H 3/62* (2013.01); *F16H 3/66* (2013.01); *F16H 2200/0065* (2013.01); *F16H 2200/2012* (2013.01); *F16H 2200/2046* (2013.01); *F16H 2200/2097* (2013.01)

(58) Field of Classification Search
CPC ...... F16H 3/62; F16H 3/66; F16H 2200/2097; F16H 2200/2046; F16H 2200/0065; F16H 2200/2012
USPC .................... 475/275, 276, 280, 282, 284
See application file for complete search history.

(56) References Cited

U.S. PATENT DOCUMENTS

| | | | |
|---|---|---|---|
| 7,828,690 B2 | 11/2010 | Wittkopp et al. | |
| 7,887,454 B2 | 2/2011 | Phillips et al. | |
| 7,985,160 B2 | 7/2011 | Jang et al. | |
| 8,038,566 B2 | 10/2011 | Phillips et al. | |
| 8,043,189 B2 | 10/2011 | Phillips et al. | |
| 8,047,954 B2 | 11/2011 | Phillips et al. | |
| 8,079,932 B2 | 12/2011 | Phillips et al. | |
| 8,177,675 B2 | 5/2012 | Wittkopp et al. | |
| 8,241,170 B2 | 8/2012 | Gumpoltsberger et al. | |
| 8,721,492 B2 | 5/2014 | Fellmann et al. | |
| 8,979,701 B2 | 3/2015 | Baldwin | |
| 9,308,808 B2 | 4/2016 | Griesmeier et al. | |
| 9,360,087 B1* | 6/2016 | Cho | F16H 3/66 |
| 2009/0036256 A1* | 2/2009 | Hukill | F16H 3/666 475/276 |
| 2009/0118058 A1* | 5/2009 | Suh | 475/275 |
| 2010/0069195 A1* | 3/2010 | Baldwin | F16H 3/66 475/276 |

(Continued)

OTHER PUBLICATIONS

H. Benford, M. Leising, The Lever Analogy: A New Tool in Transmission Analysis, 1982, Society of Automotive Engineers, Inc. 810102, p. 429-437.

*Primary Examiner* — David J Hlavka
(74) *Attorney, Agent, or Firm* — Vincent Mastrogiacomo; Brooks Kushman P.C.

(57) ABSTRACT

A transmission gearing arrangement produces at least nine forward speed ratios and one reverse speed ratio by selective engagement of three shift elements in various combinations. One embodiment includes four simple planetary gear sets, three clutches, and three brakes. A second embodiment includes four simple planetary gear sets, four clutches, and two brakes. In this second embodiment, three of the clutches and one of the brakes form a four shift element module. A third embodiment includes two axis transfer gear pairs, three simple planetary gear sets, five clutches, and one brake.

13 Claims, 3 Drawing Sheets

(56) References Cited

U.S. PATENT DOCUMENTS

| | | | |
|---|---|---|---|
| 2011/0045939 A1* | 2/2011 | Gumpoltsberger et al. | ................. 475/275 |
| 2011/0045943 A1* | 2/2011 | Gumpoltsberger et al. | ................. 475/275 |
| 2011/0275472 A1* | 11/2011 | Phillips et al. | ............... 475/275 |
| 2012/0004069 A1 | 1/2012 | Phillips et al. | |
| 2012/0115671 A1 | 5/2012 | Gumpoltsberger et al. | |
| 2012/0122626 A1 | 5/2012 | Gumpoltsberger et al. | |
| 2012/0122627 A1 | 5/2012 | Gumpoltsberger et al. | |
| 2013/0072343 A1* | 3/2013 | Shim | ........................ F16H 3/66 475/276 |
| 2013/0252780 A1* | 9/2013 | Ohnemus | .................. F16H 3/66 475/277 |
| 2013/0274059 A1 | 10/2013 | Beck et al. | |

* cited by examiner

MULTI-SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

In a first embodiment, a transmission includes four gearing arrangements, a brake, two clutches, and four intermediate shafts configured to establish nine forward speed ratios and one reverse speed ratio between an input shaft and an output shaft. The first gearing arrangement imposes a fixed linear speed relationship among the first shaft, the input shaft, and the second shaft. The first gearing arrangement may be, for example, a simple planetary gear set having a sun gear fixedly coupled to the second shaft, a carrier fixedly coupled to the input shaft, and a ring gear fixedly coupled to the first shaft. The second gearing arrangement imposes a fixed linear speed relationship among the first shaft, the second shaft, and the third shaft. The second gearing arrangement may be, for example, a simple planetary gear set having a sun gear fixedly coupled to the first shaft, a carrier fixedly coupled to the second shaft, and a ring gear fixedly coupled to the third shaft. The third gearing arrangement selectively imposes an underdrive relationship between the fourth shaft and the second shaft. The third gearing arrangement may be, for example, a simple planetary gear set having a sun gear selectively held against rotation by a brake, a carrier fixedly coupled to the fourth shaft, and a ring gear fixedly coupled to the second shaft. Alternatively, the third gearing arrangement may be, as another example, a simple planetary gear set having a sun gear fixedly held against rotation, a carrier selectively coupled to the fourth shaft by a clutch, and a ring gear fixedly coupled to the second shaft. Alternatively, the third gearing arrangement may be, as yet another example, a simple planetary gear set having a sun gear fixedly held against rotation, a carrier fixedly coupled to the fourth shaft, and a ring gear selectively coupled to the second shaft by a clutch. The fourth gearing arrangement imposes two selective proportional speed relationships. The fourth gearing arrangement may be, for example, a simple planetary gear set having a sun gear fixedly coupled to the third shaft, a carrier fixedly coupled to the output shaft, and a ring gear selectively held against rotation by a brake and a clutch selectively coupling the output shaft to the first shaft. Alternatively, the fourth gearing arrangement my, as another example, include axis transfer gearing and clutches that selectively establish the proportional speed relationships.

In a second embodiment, a transmission includes a four shift element module. A brake selectively holds a first shaft against rotation. Three clutches selectively couple the first shaft to a second shaft, a third shaft, and an input shaft, respectively. A first gearing arrangement may fixedly constrain the third shaft to rotate slower than a fourth shaft. A second gearing arrangement may impose a fixed linear speed relationship among second shaft, the fourth shaft, the input shaft, and a fifth shaft and a fixed linear speed relationship among a sixth shaft, the fourth shaft, and the fifth shaft. A third gearing arrangement may i) selectively constrain the output shaft to rotate at a speed proportional to a speed of the fifth shaft and ii) selectively constrain the output shaft to rotate at a speed proportional to a speed of the sixth shaft.

DETAILED DESCRIPTION

Figure 1:
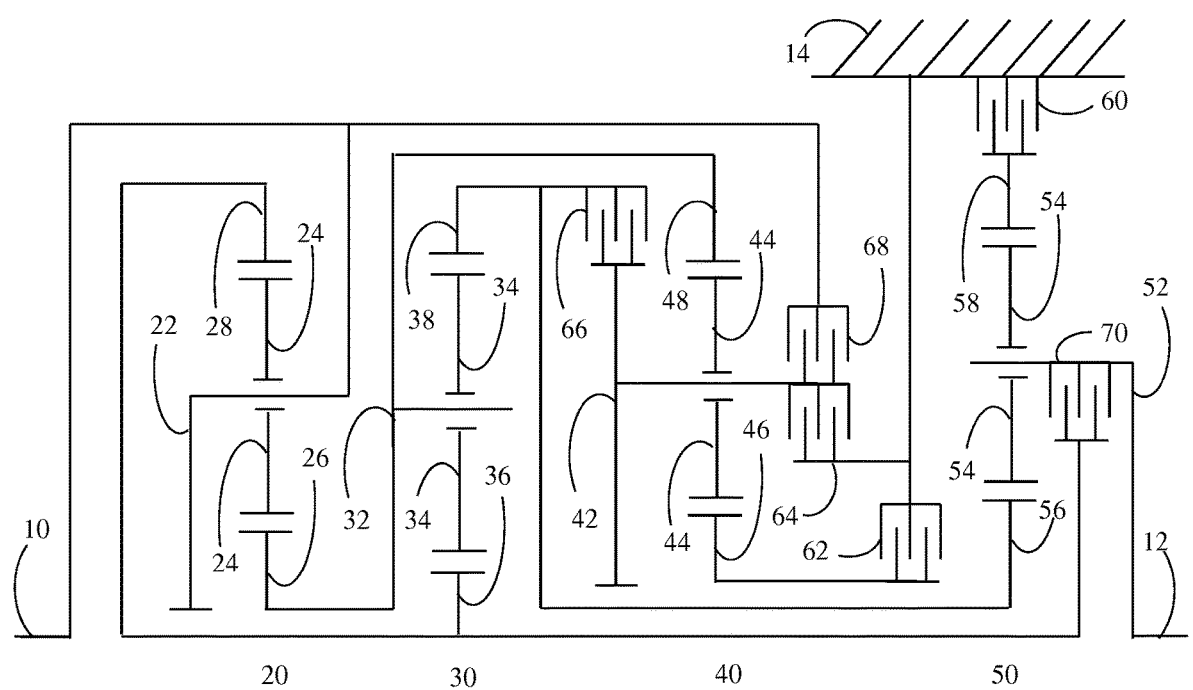
FIG. 1 is a schematic diagram of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotatable elements and shift elements configured to impose specified speed relationships among the rotatable elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotatable elements when i) the first and last rotatable element in the group are constrained to have the most extreme speeds, ii) the speeds of the remaining rotatable elements are each constrained to be a weighted average of the first and last rotatable element, and iii) when the speeds of the rotatable elements differ, they are constrained to be in the listed order, either increasing or decreasing. The speed of a rotatable element is positive when the element rotates in one direction, negative when the rotatable element rotates in the opposite direction, and zero when the rotatable element is stationary. A discrete ratio transmission has a gearing arrangement that selectively imposes a variety of speed ratios between an input shaft and an output shaft.

A group of rotatable elements are fixedly coupled to one another if they are constrained to have the same speed in all operating conditions. Rotatable elements can be fixedly coupled by spline connections, welding, press fitting, machining from a common solid, or other means. Slight variations in rotational displacement between fixedly coupled elements can occur such as displacement due to lash or shaft compliance. One or more rotatable elements that are all fixedly coupled to one another may be called a shaft. In contrast, two rotatable elements are selectively coupled by a shift element when the shift element constrains them to have the same speed whenever it is fully engaged and they have different speeds in at least some other operating condition. Two rotatable elements are coupled if they are either fixedly coupled or selectively coupled.

A shift element that holds a rotatable element against rotation by selectively connecting it to the housing is called a brake. A shift element that selectively couples two or more rotatable elements to one another is called a clutch. Shift elements may be actively controlled devices such as hydraulically or electrically actuated clutches or brakes or may be passive devices such as one way clutches or brakes.

An example transmission is schematically illustrated in FIG. 1. The transmission utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30, 40, and 50 are similarly structured.

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship between the sun gear, the ring gear, and the planet carrier.

A suggested ratio of gear teeth for each planetary gear set is listed in Table 1.

TABLE 1

| Ring 28/Sun 26 | 1.50 |
| Ring 38/Sun 36 | 2.00 |
| Ring 48/Sun 46 | 3.70 |
| Ring 58/Sun 56 | 1.70 |

In the transmission of FIG. 1, carrier 22 is fixedly coupled to input shaft 10, ring gear 28 is fixedly coupled to sun gear 36, sun gear 26 is fixedly coupled to carrier 32 and ring gear 48, ring gear 38 is fixedly coupled to sun gear 56, and output shaft 12 is fixedly coupled to carrier 52. Ring gear 58 is selectively held against rotation by brake 60. Sun gear 46 is selectively held against rotation by brake 62. Carrier 42 is selectively held against rotation by brake 64, selectively coupled to ring gear 38 by clutch 66, and selectively coupled to input shaft 10 by clutch 68. Output shaft 12 is selectively coupled to sun gear 36 by clutch 70.

Various combinations of gearing and shift elements impose particular speed relationships. The combination of gear set 40 and brake 62 selectively imposes an overdrive relationship between carrier 42 and the shaft composed of sun gear 26, carrier 32, and ring gear 48. In other words, when brake 62 is engaged, the ring gear 48 is constrained to rotate faster than carrier 42 and in the same direction. The combination of gear set 50, brake 60, and clutch 70 imposes two selective speed relationships. When brake 60 is engaged, the speed of output shaft 12 is constrained to be proportional to the speed of sun gear 56. When clutch 70 is engaged, the speed of the output shaft 12 is equal to the speed of sun gear 36. In other words, the speeds are proportional with a speed ratio of one.

As shown in Table 2, engaging the shift elements in combinations of three establishes nine forward speed ratios and one reverse speed ratio between input shaft 10 and output shaft 12. An X indicates that the shift element is required to establish the speed ratio. An (X) indicates the clutch can be applied but is not required. In 4th gear, brake 60 and clutch 70 establish the power flow path between input shaft 10 and output shaft 12. Any one of the remaining shift elements can also be applied. Applying clutch 68 ensures that all single and two step shifts from 4th gear can be accomplished by engaging only one shift element and releasing only one shift element. When the gear sets have tooth numbers as indicated in Table 1, the speed ratios have the values indicated in Table 2.

TABLE 2

|     | 60 | 62 | 64 | 66 | 68  | 70 | Ratio | Step |
|-----|----|----|----|----|-----|----|-------|------|
| Rev | X  | X  | X  |    |     |    | -3.24 | 75%  |
| 1st | X  | X  |    | X  |     |    | 4.31  |      |
| 2nd | X  |    |    | X  | X   |    | 2.70  | 1.60 |
| 3rd | X  | X  |    |    | X   |    | 1.81  | 1.50 |
| 4th | X  |    |    |    | (X) | X  | 1.45  | 1.24 |
| 5th |    | X  |    |    | X   | X  | 1.22  | 1.19 |
| 6th |    |    |    | X  | X   | X  | 1.00  | 1.22 |
| 7th |    | X  |    | X  |     | X  | 0.88  | 1.14 |
| 8th |    |    | X  | X  |     | X  | 0.73  | 1.20 |
| 9th |    | X  | X  |    |     | X  | 0.60  | 1.22 |

Figure 2:
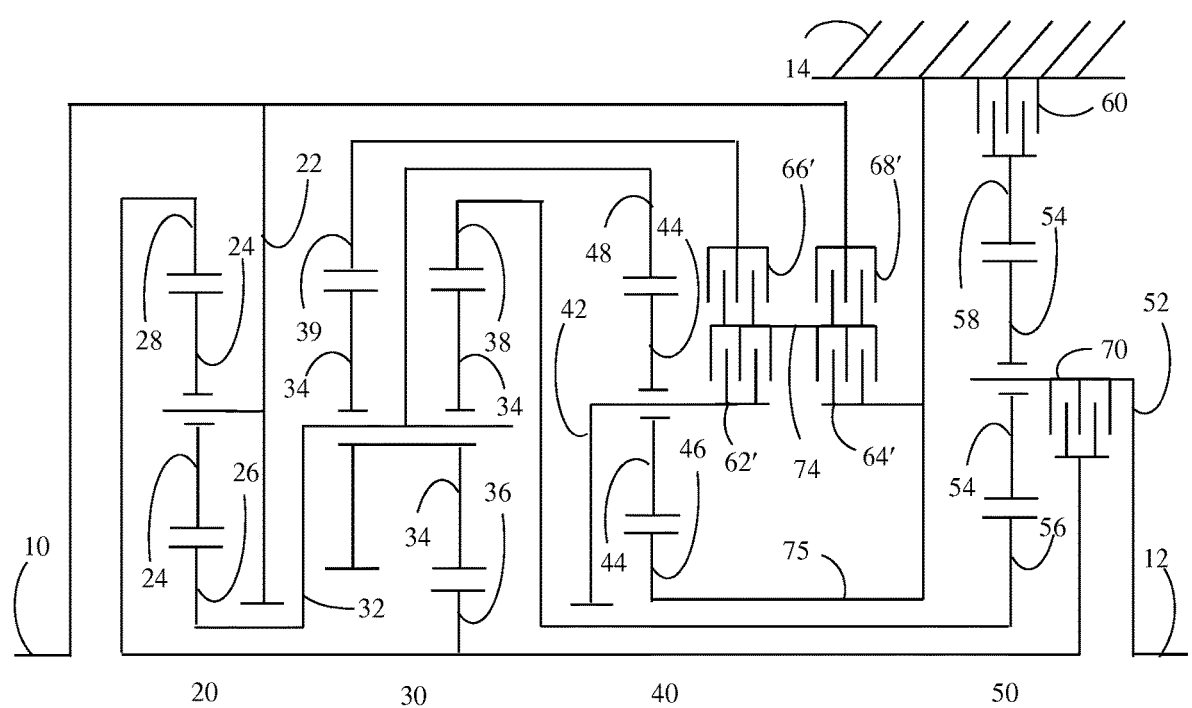
FIG. 2 is a schematic diagram of a second transmission gearing arrangement.

A second example transmission is illustrated in FIG. 2. In this transmission, simple planetary gear set 30 has a second ring gear 39 that, like ring gear 38, continuously meshes with planet gears 34. Carrier 32 extends radially outward between ring gear 39 and ring gear 38 utilizing the space circumferentially between planet gears 34 to connect with ring gear 48. Gear set 30 imposes a linear speed relationship among sun gear 36, carrier 32, and ring gear 39 and also imposes a linear speed relationship among sun gear 36, carrier 32, and ring gear 38. If the pitch radius of the portion of planet gear 34 that meshes with ring gear 38 is equal to the pitch radius of the portion that meshes with ring gear 39, then ring gear 38 and ring gear 39 will rotate in unison on all operating conditions. If planet gears 34 are stepped, then slight differences in speed between ring gear 38 and ring gear 39 will occur in some operating conditions. The ratios of tooth numbers shown in Table 1 are also applicable to the transmission of FIG. 2.

In the transmission of FIG. 2, carrier 22 is fixedly coupled to input shaft 10, ring gear 28 is fixedly coupled to sun gear 36, sun gear 26 is fixedly coupled to carrier 32 and ring gear 48, ring gear 38 is fixedly coupled to sun gear 56, sun gear 46 is fixedly held against rotation, and output shaft 12 is fixedly coupled to carrier 52. Ring gear 58 is selectively held against rotation by brake 60. Output shaft 12 is selectively coupled to sun gear 36 by clutch 70.

Intermediate shaft 74, brake 64', and clutches 62', 66', and 68' form a four shift element module. Intermediate shaft 74 is selectively held against rotation by brake 64', selectively coupled to carrier 42 by clutch 62', selectively coupled to ring gear 39 by clutch 66', and selectively coupled to input shaft 10 by clutch 68'. Applying two of the three clutches selectively couples the corresponding two rotating elements. Applying one of the clutches and the brake selectively holds the corresponding rotating element against rotation. Each of the clutches may include a clutch pack with a first set of disks that rotate with shaft 74 and a second set of disks that are interleaved between disks of the first set and connected to the respective shaft by a spline. Each of the clutches may be engaged hydraulically by routing pressurized fluid to a chamber such that the fluid forces a piston to squeeze the disks into frictional contact. Shaft 74 may include a housing into which the chambers are formed. The hydraulic fluid may be routed through channels in support member 75 and then through channels in the housing to the respective chamber. Seals contain the fluid as it passes between the stationary support and the rotating housing. Unpressurized fluid may be supplied to the opposite side of each piston to counteract the pressure in the rotating chamber caused by centrifugal forces. It is advantageous to locate the chambers for the three clutches in a single housing because a single supply of unpressurized fluid can service all three clutches, reducing the number of seals required. The brake is actuated similarly, except that it may be advantageous to locate the chamber and piston in the stationary support.

Various combinations of gearing and shift elements impose particular speed relationships. The combination of gear sets 20 and 30 imposes a linear speed relationship among either ring gear 38 or ring gear 39, the shaft composed of sun gear 26, carrier 32, and ring gear 48, input shaft 10, and the shaft composed of ring gear 28 and sun gear 36. Other gearing arrangements also impose a linear relationship among four elements. Specifically, any two planetary gear sets with two elements of the first gear set fixedly coupled to two elements of the second gear set impose a linear speed relationship among four shafts. The combination of gear set 40 and clutch 62' selectively imposes an overdrive relationship between intermediate shaft 74 and the shaft composed of sun gear 26, carrier 32, and ring gear 48. The shift elements are applied in accordance with Table 2 to establish nine forward and one reverse speed ratio.

Figure 3:
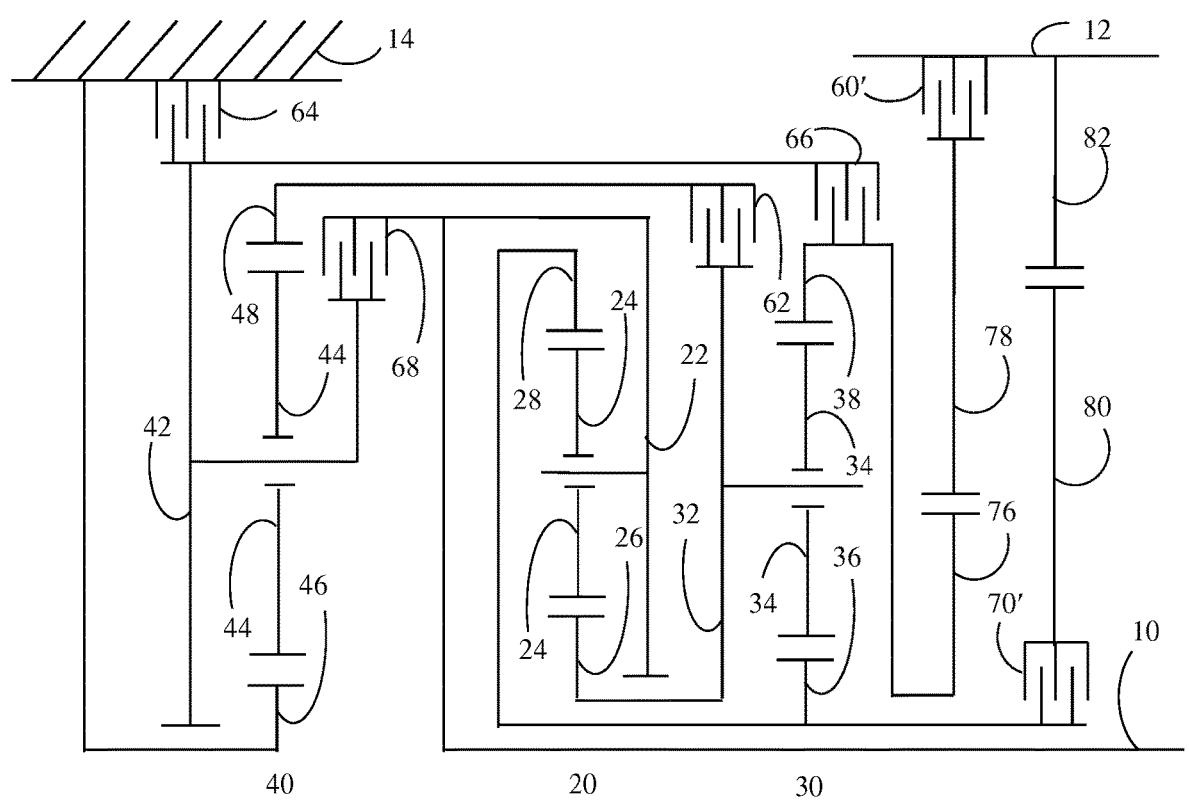
FIG. 3 is a schematic diagram of a third transmission gearing arrangement.

A third example transmission, having three simple planetary gear sets 20, 30 and 40, is illustrated in FIG. 3. Output shaft 12 rotates about a second axis which is substantially parallel to the input axis. Axis transfer gears 76 and 80 are supported for rotation about the input axis while axis transfer gears 78 and 82 are supported for rotation about the output axis. Axis transfer gears 76 and 80 are in continuous meshing engagement with axis transfer gears 78 and 82 respectively. It is suggested that pitch diameters be selected such that the ratio of gear 78 to gear 76 multiplied by the ratio of gear 80 to gear 82 be approximately 2.70.

In the transmission of FIG. 3, carrier 22 is fixedly coupled to input shaft 10, ring gear 28 is fixedly coupled to sun gear 36, sun gear 26 is fixedly coupled to carrier 32, ring gear 38 is fixedly coupled to axis transfer gear 76, sun gear 46 is fixedly held against rotation, and output shaft 12 is fixedly coupled to axis transfer gear 82. Axis transfer gear 78 is selectively coupled to the output shaft by clutch 60'. Ring gear 48 is selectively coupled to sun gear 26 and carrier 32 by clutch 62". Carrier 42 is selectively held against rotation by brake 64, selectively coupled to ring gear 38 by clutch 66, and selectively coupled to input shaft 10 by clutch 68. Axis transfer gear 80 is selectively coupled to sun gear 36 by clutch 70'.

Various combinations of gearing and shift elements impose particular speed relationships. The combination of gear set 40 and clutch 62" selectively imposes an overdrive relationship between carrier 32 and the shaft composed of sun gear 26 and carrier 32. The combination of axis transfer gears 76, 78, 80, and 82 and clutches 60' and 70' imposes two selective speed relationships. When clutch 60' is engaged, the speed of output shaft 12 is constrained to be proportional to the speed of ring gear 38. When clutch 70' is engaged, the speed of output shaft 12 is constrained to be proportional to the speed of sun gear 36.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   first, second, third, and fourth shafts;
   an input shaft;
   an output shaft;
   a first gearing arrangement configured to fixedly impose a linear speed relationship among the first shaft, the input shaft, and the second shaft;
   a second gearing arrangement configured to fixedly impose a linear speed relationship among the first shaft, the second shaft, and the third shaft;
   a third gearing arrangement configured to selectively constrain the fourth shaft to rotate slower than the second shaft and in a same direction;
   a fourth gearing arrangement configured to i) selectively constrain the output shaft to rotate at a speed proportional to a speed of the first shaft and ii) selectively constrain the output shaft to rotate at a speed proportional to a speed of the third shaft;
   a first brake configured to selectively hold the fourth shaft against rotation; and
   a first clutch configured to selectively couple the fourth shaft to the input shaft.

2. The transmission of claim 1 wherein the first gearing arrangement comprises:
   a first simple planetary gear set having a first sun gear fixedly coupled to the second shaft, a first ring gear fixedly coupled to the first shaft, a first planet carrier fixedly coupled to the input shaft, and at least one planet gear supported for rotation on the first planet carrier and in continuous meshing engagement with the first sun gear and the first ring gear.

3. The transmission of claim 1 further comprising a second clutch configured to selectively couple the third shaft to the fourth shaft.

4. The transmission of claim 3 wherein the second gearing arrangement comprises:
a second simple planetary gear set having a second sun gear fixedly coupled to the first shaft, a second ring gear fixedly coupled to the third shaft, a second planet carrier fixedly coupled to the second shaft, and at least one planet gear supported for rotation on the second planet carrier and in continuous meshing engagement with the second sun gear and the second ring gear.

5. The transmission of claim 1 further comprising a second clutch configured to selectively couple a fifth shaft to the fourth shaft and wherein the second gearing arrangement is further configured to fixedly impose a linear speed relationship among the first shaft, the second shaft, and the fifth shaft.

6. The transmission of claim 5 wherein the second gearing arrangement comprises:
a second simple planetary gear set having a second sun gear fixedly coupled to the first shaft, a second ring gear fixedly coupled to the third shaft, a fifth ring gear fixedly coupled to the fifth shaft, a second planet carrier fixedly coupled to the second shaft, and at least one planet gear supported for rotation on the second planet carrier and in continuous meshing engagement with the second sun gear, the second ring gear, and the fifth ring gear.

7. The transmission of claim 1 wherein the third gearing arrangement comprises:
a third simple planetary gear set having a third sun gear, a third ring gear fixedly coupled to the second shaft, a third planet carrier fixedly coupled to the fourth shaft, and at least one planet gear supported for rotation on the third planet carrier and in continuous meshing engagement with the third sun gear and the third ring gear; and
a second brake configured to selectively hold the third sun gear against rotation.

8. The transmission of claim 1 wherein the third gearing arrangement comprises:
a third simple planetary gear set having a third sun gear fixedly held against rotation, a third ring gear fixedly coupled to the second shaft, a third planet carrier, and at least one planet gear supported for rotation on the third planet carrier and in continuous meshing engagement with the third sun gear and the third ring gear; and
a third clutch configured to selectively couple the fourth shaft to the third planet carrier.

9. The transmission of claim 1 wherein the third gearing arrangement comprises:
a third simple planetary gear set having a third sun gear fixedly held against rotation, a third ring gear, a third planet carrier fixedly coupled to the fourth shaft, and at least one planet gear supported for rotation on the third planet carrier and in continuous meshing engagement with the third sun gear and the third ring gear; and
a third clutch configured to selectively couple the second shaft to the third ring gear.

10. The transmission of claim 1 wherein the fourth gearing arrangement comprises:
a fourth simple planetary gear set having a fourth sun gear fixedly coupled to the third shaft, a fourth ring gear, a fourth planet carrier fixedly coupled to the output shaft, and at least one planet gear supported for rotation on the fourth planet carrier and in continuous meshing engagement with the fourth sun gear and the fourth ring gear;
a fourth clutch configured to selectively couple the first shaft to the output shaft; and
a third brake configured to selectively hold the fourth ring gear against rotation.

11. The transmission of claim 1 wherein the fourth gearing arrangement comprises:
a first axis transfer gear coupled to the third shaft;
a second axis transfer gear coupled to the output shaft and in continuous meshing engagement with the first axis transfer gear;
a third axis transfer gear coupled to the first shaft; and
a fourth axis transfer gear coupled to the output shaft and in continuous meshing engagement with the third axis transfer gear.

12. The transmission of claim 11 wherein the fourth gearing arrangement further comprises a fourth clutch configured to selectively couple the second axis transfer gear to the output shaft.

13. The transmission of claim 11 wherein the fourth gearing arrangement further comprises a fifth clutch configured to selectively couple the third axis transfer gear to the first shaft.

* * * * *